June 3, 1930.  W. C. DUNN  1,761,255
FLUID TRANSMISSION MECHANISM
Filed March 16, 1925

Inventor
William C. Dunn
By

Patented June 3, 1930

1,761,255

UNITED STATES PATENT OFFICE

WILLIAM C. DUNN, OF CHICAGO, ILLINOIS

FLUID-TRANSMISSION MECHANISM

Application filed March 16, 1925. Serial No. 15,855.

This invention relates to improvements in fluid transmission and one of the objects of the same is to provide improved mechanism of this character whereby power may be transmitted from a driving to a driven element without the necessity of shifting gears.

A further object is to provide improved means for circulating the fluid and for trapping the fluid to increase pressure thereon, the fluid under such increased pressure operating to lock the fluid circulation elements against predetermined relative movements and thereby establish a direct driving connection between the driving and driven elements.

A further object is to provide an improved mechanism of this character which will be of a simple, durable, cheap and compact arrangement and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view as taken on line 1—1, Figure 2, of one of the fluid circulating elements of a fluid transmission constructed in accordance with the principles of this invention.

Figure 1:
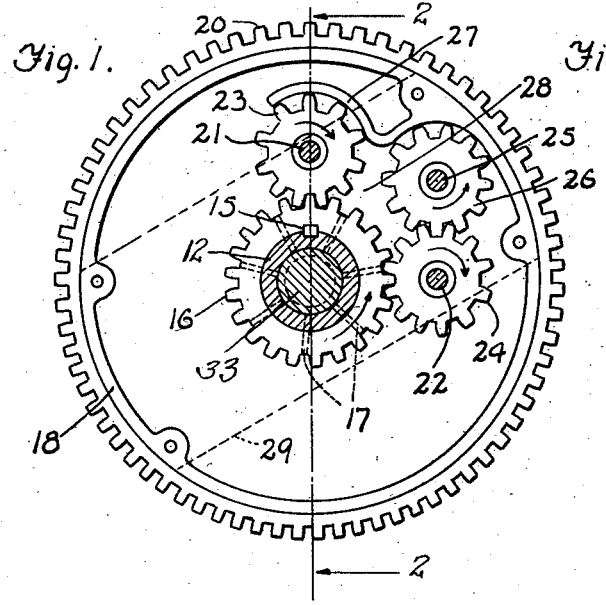
Figure 2:
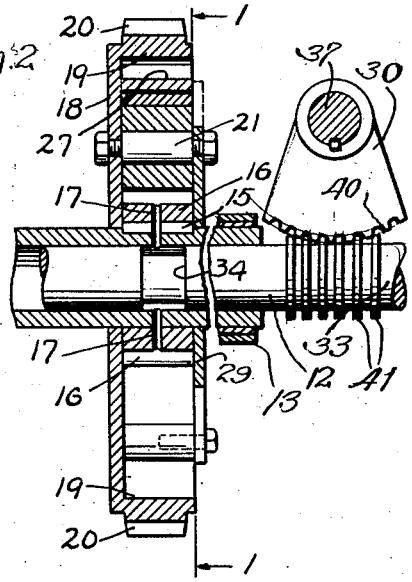
Figure 2 is a sectional view as taken on line 2—2, Figure 1.

Referring more particularly to the drawings the numeral 12 designates generally a tubular portion of a driven shaft.

Secured to the shaft 12 in any desired or suitable manner, preferably through the medium of keys 15, is a gear 16 which rotates with the shaft.

Any number of these gears 16 may be provided according to the number of changes of speed that it is desired to produce.

The gear 16 is provided with a plurality of radially arranged ports or passages 17, which have communication through registering openings with the interior of the tubular shaft 12.

Loosely encompassing the tubular shaft 12 adjacent the gear 16 is a disc like element 18 which stands in close proximity to one of the lateral faces of the gear 16. The periphery of the disc 18 is deflected laterally as at 19 to extend in a direction over the gear 16, and the periphery of the deflected portion 19 is provided with gear teeth 20. The flange 19 with the teeth 20 thereon form an annular member, the internal diameter of which is considerably greater than the diameter of the gear 16, and forms a casing for the gears, to be hereinafter described.

Supported by the element 18 for bodily movement therewith and with respect thereto, through the medium of pivots or journals 21—22, are gears 23—24, both of which mesh with the gear 16, and the gears 23—24 are spaced for a considerable distance from each other. Supported by the element 18 for rotation therewith and with respect thereto by means of a journal 25 is another gear 26, which meshes with the gear 24. The periphery of the gear 26 is spaced from the periphery of the gear 16 and also of the gear 23.

A flange or wall 27 is connected with the element 18 and projects laterally from the face thereof and in close proximity to the peripheries of the gears 23 and 26. This flange or wall 27 forms a closure for the space between the teeth of the respective gears 23—24 and also for the open portion of a space 28 between the gears 16, 23, 24 and 26, and with which space 28 the radial passages 17 in the gear 16 have communication.

A plate or member 29 is provided which extends across portions of the lateral faces of the gears and cooperates with the wall of the element 18 to form a closure for the lateral face of the space 28.

The element 18 together with the gears 23, 24 and 26 supported thereby, are adapted to be rotated about the shaft 12, the gear 16 being normally held against rotation by the shaft and the mechanism connected with the shaft. When motion is imparted to the element 18 through the medium of the teeth 20 to rotate the element 18 about the shaft 12, a rotary motion will be imparted to the gears 23, 24 and 26 in the directions indicated by the arrows on the respective gears. As these gears 23, 24 and 26 are rotated they will together with the gear 16 operate as pumping gears for circulating the fluid around the peripheries of the gears 23 and 26 and into the space 28. From this space 28 the fluid will circulate through the radial passages 17 in the gear 16.

Motion may be imparted to the element 18 in any suitable manner.

It will be manifest that so long as the gear 16 is held against rotation and the element 18 is allowed to rotate, carrying with it the supported gears 23, 24 and 26, there will be a free circulation of the fluid in the manner just described from the source of supply and through the passages 17 in the gear 16.

During this circulation the shaft 12 will remain idle.

When it is desired to rotate the shaft or element 12 the gears 23, 24 and 26 must be locked against rotation with respect to the element 18 so that motion from the source of power will then be transmitted to the shaft 12 through the medium of the interconnecting gears. Any suitable mechanism may be provided for effecting this locking of the gears. A suitable and efficient means embodies a valve 33 which fits within the tubular shaft 12. This valve is provided with a cut away or recessed portion 34 extending about the circumference of the valve, and the space formed by the cut away portion 34 of the valve is of such a size and is so shaped and arranged that by longitudinally shifting the valve 33 in the tubular shaft 12, the radial openings 17 in the gears 16 may be controlled.

Any suitable means may be provided for shifting the valve 33. A simple and efficient means embodies a shaft 37, connected with which is a segment 39 having teeth 40 which mesh with ribs or shoulders 41 on the valve, so that when the shaft 37 is rotated in any suitable manner, the valve 33 will be moved forwardly or backwardly.

As has already been stated, when the radial passages 17 in the gears 16 are open there will be an idle circulation of the fluid by the gears 23, 24 and 26, and they will travel bodily around the gear 16.

When, however, the valve 33 is adjusted to close the passages 17 in the gear 16, will be locked with the gears 23, 24 and 26 by reason of the fact that when the passages 17 are closed, the gears 23, 24 and 26 will be operating to pump the fluid or circulate it from the source of supply into the space 28. As this fluid cannot escape from the space a continued operation of the gears 23, 24 and 26 will increase the pressure of the fluid trapped within the space 28 and this pressure will be exerted upon the gears 23, 24 and 26 and will lock them with respect to the element 18 to produce a direct drive through the intermeshing gears to the shaft 12, causing the gear 16 to be rotated by the gears 23, 24 and 26.

When the valve 33 is adjusted to open the passages 17, which have been thus closed, the gears 23, 24 and 26 will then operate to circulate the fluid from the space 28 through the passages 17 and an idle circulation of the fluid will be obtained.

Figure 3:
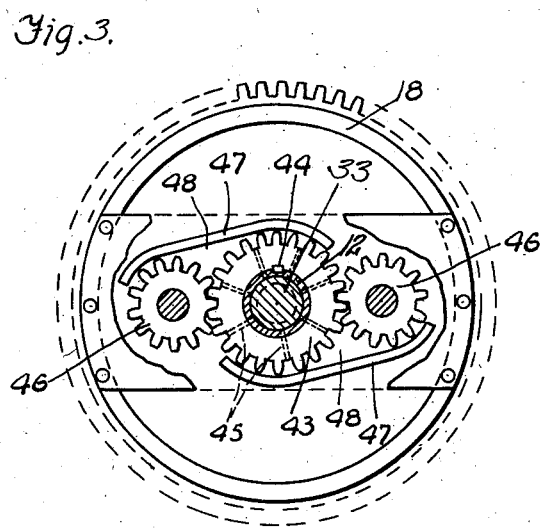
Figure 3 is a view similar to Figure 1, partly in elevation, partly in section and partly broken away of another form of the invention.
Figure 4:
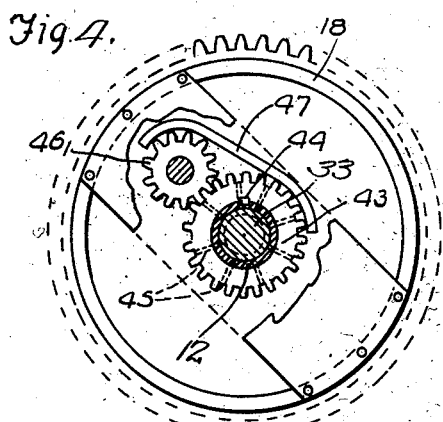
Figure 4 is a view similar to Figure 3, partly in elevation and partly broken away.

In the form of fluid circulating element shown in Figures 3 and 4, the gear 43, which corresponds with the gear 16, is keyed to the shaft 12 by means of the key 44. This gear 43 is provided with passages 45 similar to the passages 17, and meshing with the gear 43 and on opposite sides thereof are gears 46, which correspond with the gears 23 and 24. In this form of the invention the element 18 is provided with a laterally projecting flange or flanges 47 which extend over portions of the gear 43 and the respective gears 46 to form spaces 48 between the flanges 47 and the gear 45 and respective gears 46.

The operation of this form of the invention is the same as that described in connection with the form shown in Figure 1.

In Figure 4 there is shown a form of the invention similar to Figure 3 except that one of the gears 46 and one of the flanges 47 is omitted.

With this improved construction it will be manifest that there is provided an improved transmission through the medium of which the pressure built up or created upon a portion of the fluid which is trapped between the gears operates as a means for locking predetermined gears against relative rotation, thereby imparting a direct driving motion from the driving to the driven element. When these gears are unlocked with respect to each other they will operate as fluid circulation elements, thereby imparting an idle circulation to the fluid.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. Fluid transmission mechanism including a driving element, a driven element, a normally stationary gear connected with the driven element for rotation therewith, a support rotatable about the same axis as the said driven element, fluid circulation gears carried by the support for rotation with respect thereto and for bodily rotation therewith, a portion only of said gears meshing with the first said gear, said fluid circulation gears being spaced to form a fluid receiving chamber therebetween, portions of the walls of which chamber are formed by the peripheries of said gears, a flange on the support also forming a portion of the wall of said chamber, said chamber having an outlet, the said circulation gears being rotated about the first said gear and also about their axes with respect to the support to circulate the fluid through said chamber when the support is rotated, and means for controlling said outlet to trap the fluid in said chamber for causing pressure to be increased upon the trapped fluid whereby when the said support is then rotated the first recited gear and the said driven element will be rotated, the last recited means including a fluid passage leading from the said chamber through one of said gears and a valve device for controlling said passage.

2. Fluid transmission mechanism including a driving element, a driven shaft, a normally stationary gear secured to the shaft for rotation therewith, a support loosely mounted upon the shaft and rotatable with respect thereto, fluid circulation gears mounted upon the support for rotation with respect thereto and for bodily rotation therewith, all of said gears respectively intermeshing and being spaced to form a fluid chamber therebetween, the peripheries of the gears constituting portions of the walls of the chamber, there being radial passages leading through one of the said gears and the said shaft to constitute fluid outlets from the said chamber, the fluid when the support is rotated, being circulated between the said gears, into the chamber and from the chamber through the said outlets, and means for controlling said outlets to trap the fluid in said chamber and cause pressure to be increased upon the trapped fluid whereby the rotation of the said support will then rotate the first recited gear and the said shaft.

3. Fluid transmission mechanism including a driving element, a hollow driven shaft, a normally stationary gear secured to the shaft for rotation therewith, a support loosely mounted upon the shaft and rotatable with respect thereto, fluid circulation gears mounted upon the support for rotation with respect thereto and for bodily rotation therewith, all of said gears respectively intermeshing and being spaced to form a fluid chamber therebetween, the peripheries of the gears constituting portions of the walls of the chamber, there being radial passages leading through one of the said gears and the said shaft to constitute fluid outlets from the said chamber, the fluid, when said support is rotated being circulated between the said gears, into the chamber and from the chamber through the said outlets, and means within the said hollow shaft for controlling said outlets to trap the fluid in said chamber and cause pressure to be increased upon the trapped fluid whereby the rotation of the said support will then rotate the first recited gear and the said shaft.

4. Fluid transmission mechanism including a driving element, a hollow driven shaft, a normally stationary gear secured to the shaft for rotation therewith, a support loosely mounted upon the shaft and rotatable with respect thereto, fluid circulation gears mounted upon the support for rotation with respect thereto and for bodily rotation therewith, all of said gears respectively intermeshing and being spaced to form a fluid chamber therebetween, the peripheries of the gears constituting portions of the walls of the chamber, there being radial passages leading through one of the said gears and the said shaft to constitute fluid outlets from the said chamber, the fluid, when said support is rotated being circulated between the said gears, into the chamber and from the chamber through the said outlets, a valve device within the said hollow shaft for controlling the said outlets to trap the fluid in the said chamber to cause pressure to be increased upon the fluid thus trapped whereby the rotation of the said support will then rotate the first recited gear and the said shaft, and means for controlling at will the actuation of the said valve device.

5. Fluid transmission mechanism including a shaft, a normally stationary gear secured to the shaft for rotation therewith, a support loosely mounted upon the shaft and rotatable with respect thereto, fluid circulation gears mounted upon the support for rotation with respect thereto and for bodily rotation therewith, all of said gears respectively intermeshing and being spaced to form a fluid chamber therebetween, the peripheries of the gears constituting portions of the walls of the chamber, there being radial passages leading through one of the said gears and the said shaft to constitute fluid outlets from the said chamber, means for rotating said support to circulate fluid between the said gears, into the chamber and from the chamber through the said outlets, and means for controlling said outlets to trap the fluid in said chamber and cause pressure to be increased upon the tapered fluid whereby the rotation of the said support will then rotate the first recited gear and the said shaft.

In testimony whereof I have signed my name to this specification, on this 10th day of March, A. D. 1925.

WILLIAM C. DUNN.